United States Patent
Kevelos et al.

(10) Patent No.: US 8,393,747 B2
(45) Date of Patent: Mar. 12, 2013

(54) FACEPLATE GUIDELIGHT SYSTEM

(75) Inventors: Adam Kevelos, Coram, NY (US); James Richter, Bethpage, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 435 days.

(21) Appl. No.: 12/725,991

(22) Filed: Mar. 17, 2010

(65) Prior Publication Data

US 2011/0228552 A1    Sep. 22, 2011

(51) Int. Cl.
*F21V 8/00*    (2006.01)

(52) U.S. Cl. .......... 362/95; 362/602; 362/551; 362/558

(58) Field of Classification Search ............... 362/558, 362/95, 360, 355, 602–603, 615, 629, 551, 362/555, 85, 147, 249.05, 249.12; 174/66, 174/67; 220/241, 242
See application file for complete search history.

(56) References Cited

U.S. PATENT DOCUMENTS

| | | |
|---|---|---|
| 2,227,549 A | 1/1941 | McNeill |
| 2,420,000 A | 5/1947 | Linton |
| 2,612,597 A | 9/1952 | Sherrard |
| 3,265,888 A | 8/1966 | Adolphson, Jr. |
| 3,588,489 A | 6/1971 | Gaines |
| 3,739,226 A | 6/1973 | Seiter et al. |
| 3,746,877 A | 7/1973 | Seiter et al. |
| 3,895,225 A | 7/1975 | Prior |
| 4,038,582 A | 7/1977 | Horwinski |
| 4,418,979 A | 12/1983 | Takashima |
| 4,514,789 A | 4/1985 | Jester |
| 4,522,455 A | 6/1985 | Johnson |

(Continued)

FOREIGN PATENT DOCUMENTS

| EP | 1 737 008 A2 | 12/2006 |
|---|---|---|
| EP | 1 737 008 A3 | 4/2007 |

(Continued)

OTHER PUBLICATIONS

English language Abstract European Patent No. EP 0411388 (A1), dated Feb. 8, 1991.

(Continued)

*Primary Examiner* — Bao Q Truong
(74) *Attorney, Agent, or Firm* — Scully, Scott, Murphy & Presser, P.C.

(57) ABSTRACT

A faceplate lighting system and method for illuminating a faceplate that provides substantial illumination of the faceplate to provide a guidelight or nightlight effect for environments without providing electrical power to or through the faceplate itself. The faceplate comprises an assembly including: a clear or translucent or transparent outer faceplate, and, a lightpipe membrane disposed beneath the clear or translucent or transparent outer faceplate. A wall-mounted electrical device is configured to include a light source(s) integrated within the device itself, to provide light under certain operating conditions. The light source is disposed in a manner such that when the faceplate assembly is overlayed onto a surface-mounted electrical device, the clear lightpipe membrane is aligned to directly receive light from the electrical device light source(s). The lightpipe membrane incorporates light pipe features that distribute received light across the surface of the faceplate. Alternately, the faceplate for a wall-mounted electrical device comprises a single plastic lightpipe having a first translucent or transparent surface that is exposed when overlayed onto the wall-mounted electrical device, and receiving light from the wall-mounted device for illuminating the exposed surface without transmitting electrical power to or through the faceplate itself.

29 Claims, 5 Drawing Sheets

U.S. PATENT DOCUMENTS

| | | | |
|---|---|---|---|
| 4,546,419 A | 10/1985 | Johnson | |
| 4,667,073 A | 5/1987 | Osika | |
| 4,755,913 A | 7/1988 | Sleveland | |
| 4,774,641 A | 9/1988 | Rice | |
| 5,473,517 A | 12/1995 | Blackman | |
| 5,485,356 A | 1/1996 | Nguyen | |
| 5,811,729 A | 9/1998 | Rintz | |
| 5,811,730 A | 9/1998 | Rintz | |
| 5,833,350 A | 11/1998 | Moreland | |
| 5,874,693 A | 2/1999 | Rintz | |
| 6,000,807 A | 12/1999 | Moreland | |
| 6,045,232 A | 4/2000 | Buckmaster | |
| 6,051,787 A | 4/2000 | Rintz | |
| 6,078,113 A | 6/2000 | True et al. | |
| 6,089,893 A | 7/2000 | Yu et al. | |
| 6,350,039 B1* | 2/2002 | Lee | 362/95 |
| 6,355,885 B1 | 3/2002 | Rintz et al. | |
| 6,386,725 B1 | 5/2002 | Amburgey | |
| 6,433,555 B1 | 8/2002 | Leopold et al. | |
| 6,547,411 B1* | 4/2003 | Dornbusch | 362/95 |
| 6,578,980 B1 | 6/2003 | Chen et al. | |
| 6,608,253 B1 | 8/2003 | Rintz | |
| 6,765,149 B1* | 7/2004 | Ku | 174/66 |
| 6,805,469 B1 | 10/2004 | Barton | |
| 6,808,283 B2 | 10/2004 | Tsao | |
| 6,827,602 B2 | 12/2004 | Greene et al. | |
| 6,883,927 B2 | 4/2005 | Cunningham et al. | |
| 6,929,376 B2 | 8/2005 | Harris | |
| 6,962,505 B1 | 11/2005 | Savicki, Jr. et al. | |
| 6,986,589 B2 | 1/2006 | Evans et al. | |
| 7,009,111 B1 | 3/2006 | Rintz | |
| 7,011,422 B2* | 3/2006 | Robertson et al. | 362/95 |
| 7,036,948 B1* | 5/2006 | Wyatt | 362/95 |
| 7,045,975 B2 | 5/2006 | Evans | |
| 7,118,235 B2 | 10/2006 | Barton | |
| 7,213,932 B1 | 5/2007 | Savicki, Jr. | |
| 7,270,436 B2 | 9/2007 | Jasper | |
| 7,273,983 B1 | 9/2007 | Rintz | |
| 7,360,912 B1 | 4/2008 | Savicki, Jr. | |
| 7,416,310 B1 | 8/2008 | Savicki, Jr. | |
| 7,547,131 B2 | 6/2009 | Faunce | |
| 7,549,785 B2 | 6/2009 | Faunce | |
| 7,589,718 B2 | 9/2009 | Hu et al. | |
| 7,726,825 B2 | 6/2010 | Mandapat et al. | |
| 2002/0172042 A1 | 11/2002 | Wen-Chung | |
| 2003/0092297 A1 | 5/2003 | Reindle et al. | |
| 2005/0012633 A1 | 1/2005 | Yoon | |
| 2005/0152128 A1 | 7/2005 | Campman | |
| 2007/0171625 A1 | 7/2007 | Glazner | |
| 2007/0193866 A1 | 8/2007 | Eder et al. | |
| 2007/0251712 A1 | 11/2007 | Berg et al. | |
| 2007/0291469 A1 | 12/2007 | Chen | |
| 2008/0073117 A1 | 3/2008 | Misener | |
| 2009/0032278 A1 | 2/2009 | Weeks et al. | |
| 2009/0035967 A1 | 2/2009 | Weeks et al. | |
| 2009/0052162 A1 | 2/2009 | Richter et al. | |
| 2009/0141477 A1 | 6/2009 | Bhosale et al. | |
| 2011/0156920 A1 | 6/2011 | Weeks et al. | |

FOREIGN PATENT DOCUMENTS

| | | |
|---|---|---|
| EP | 1 727 170 B1 | 11/2009 |
| JP | 2005-166252 | 4/2005 |
| JP | 2005-183319 | 7/2005 |
| KR | 10-2005-0119842 | 12/2005 |
| WO | WO 01/61244 | 8/2001 |
| WO | WO 2004023034 | 3/2004 |

OTHER PUBLICATIONS

Search Report, PCT International Search Authority, dated Feb. 27, 2009.

* cited by examiner

FACEPLATE GUIDELIGHT SYSTEM

BACKGROUND

The present invention relates generally to faceplates, e.g., for at least partially covering an electrically powered wall mounted device, and particularly, to a faceplate and light guiding system combination for illuminating the faceplate.

There currently exists faceplate devices for coupling with wall boxes or other attachment hardware secured within a wall defined by wallboard or other wall material.

It would be desirable to provide a guidelighting system for such faceplate devices that is configured to collect and distribute light along the surface of the faceplate itself from a light source provided within the wall mounted device.

SUMMARY

A faceplate guidelighting system and method for illuminating an electrical device faceplate that provides substantially complete illumination of the faceplate to provide a guidelight or nightlight effect for low ambient light environments without providing electrical power to or through the faceplate itself.

In one embodiment, there is provided an illumination system for an electrical box mounted electrical device having at least one side edge portion, the at least one side edge portion extending outward beyond a plane of a mounting surface, the system comprising: at least one light source disposed at least partially within an electrical device and adapted for generating output light at the at least one side edge portion of the device; and, a faceplate adapted to overlay the electrical device, the faceplate comprising: an outer plate which is at least partially translucent; and, a lightpipe membrane fastened to or integrated with the outer plate, the underlying lightpipe membrane defining at least one lightpipe membrane inner edge surface portion; wherein, when the faceplate overlies the electrical device, the at least one the lightpipe membrane inner edge surface portion is aligned with at least one side edge portion of the device wherein generated output light at a side edge portion of the device is received by the lightpipe membrane via a respective the at least one inner edge surface portion, the lightpipe membrane diffusing the received light for illuminating an entire exposed surface of the translucent outer plate.

Further to this embodiment, the faceplate cover assembly further comprises a reflector element disposed adjacent to underlying said lightpipe membrane and fastened to or integrated with said faceplate cover assembly for reflecting any light received by said lightpipe membrane to said exposed surface of said translucent outer cover plate.

Further to this embodiment, the electrical device receives power from a line voltage source, the system further comprising: a circuit disposed to regulate conduction of electrical power from said line voltage source to said at least one light source for controlling said at least one light source according to one or more determined conditions.

In a further aspect, the electrical device comprises a light sensor adapted to detect an ambient light level, one of said determined conditions including an absence of detected light.

In a further aspect the power regulating circuit is disposed to control at least one output parameter of the light source where the output parameter is one of color; intensity; pulse rate; or, a combination thereof.

In a further aspect, there is provided a method for illuminating an electrical box mounted electrical device having at least one side edge portion, the at least one side edge portion extending outward beyond a plane of a mounting surface, the method comprising: attaching a faceplate to the electrical device, the faceplate adapted to overly the electrical device and including an outer plate which is at least partially translucent and, a lightpipe membrane fastened to or integrated with the outer plate, the underlying lightpipe membrane defining at least one lightpipe membrane inner edge surface portion configured to align with said at least one side edge portion of said device; detecting a condition of the electrical device; conducting an electrical power source to a light source integrated in the electrical device and adapted for generating light for output at the at least one side edge portion of the device in response to the detected condition, the conducted power for generating light from the at least one light source integrated within the device; receiving, at the underlying lightpipe membrane, the light generated from an integrated powered light source; and diffusing, by the underlying lightpipe membrane, the received light for illuminating an exposed surface of the translucent outer plate.

In a further aspect, there is provided a faceplate for a wall-mounted electrical device comprising a single plastic lightpipe having a first translucent surface that is exposed when overlayed onto the wall-mounted electrical device, and receiving light from the wall-mounted device for illuminating the exposed surface without transmitting electrical power to or through the faceplate itself. The faceplate comprising a single plastic lightpipe may include a second light reflecting surface.

BRIEF DESCRIPTION OF THE DRAWINGS

The foregoing objects and advantages of the present invention may be more readily understood by one skilled in the art with reference being had to the following detailed description of several embodiments thereof, taken in conjunction with the accompanying drawings wherein like elements are designated by identical reference numerals throughout the several views, and in which.

DETAILED DESCRIPTION

Figure 1:
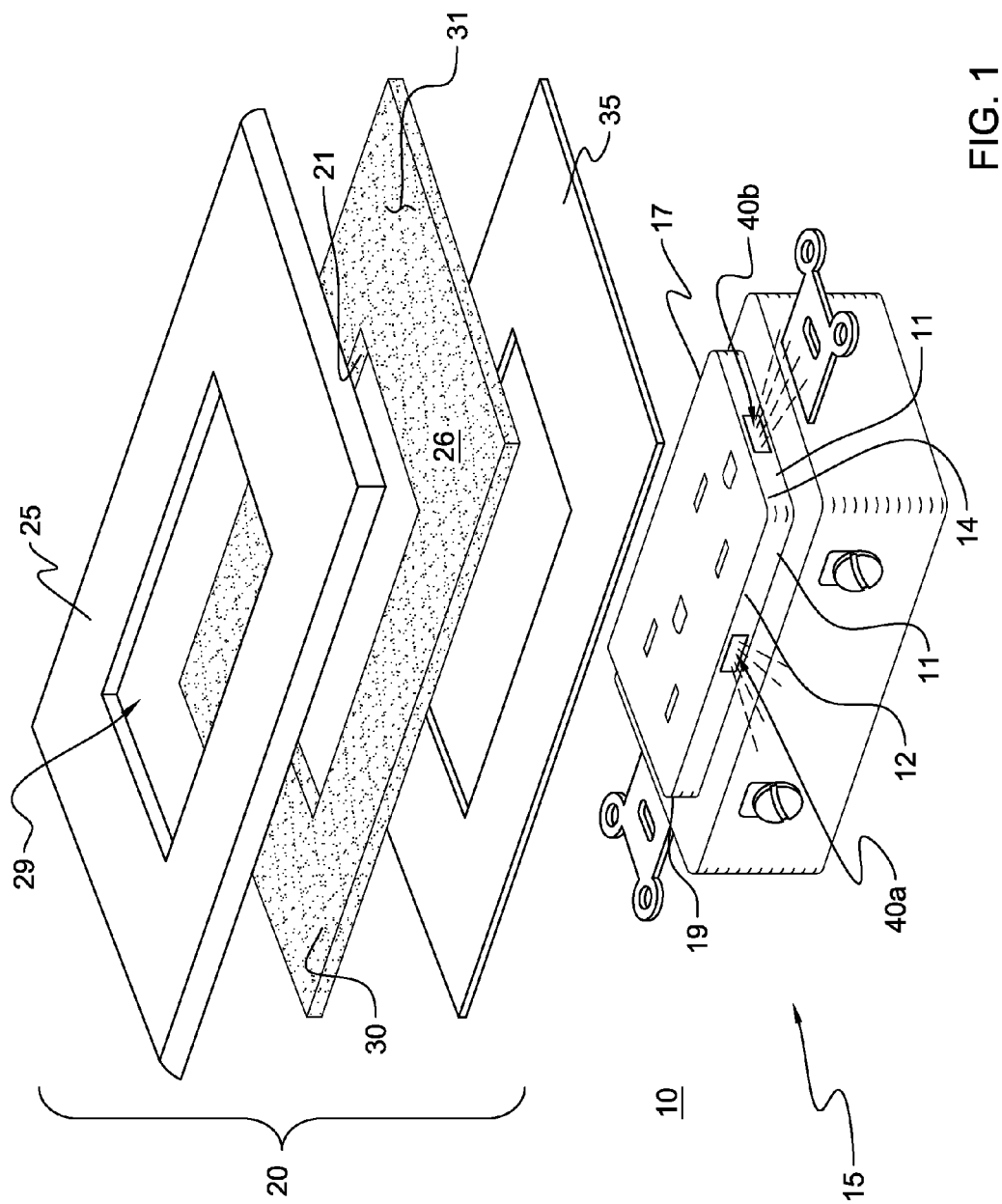
FIG. 1 illustrates a faceplate guidelight system 10 including a wall-mounted electrical device 15 and faceplate assembly 20 according to the present invention.

FIG. 1 illustrates a faceplate guidelight system 10 including a wall-mounted electrical device 15, e.g., a wired light or fan switch, electronic dimmer switch, electrical outlet or socket, duplex or triplex receptacle, or combinations of the above, etc., and, a faceplate assembly 20 shown in exploded view. The wall-mounted electrical device can be any suitable electrical device, or electrical wiring device, known in the industry employing any suitable voltage including line or low voltage. In FIG. 1, the faceplate assembly 20 includes comprising a clear or translucent outer faceplate 25 comprising a plastic or polymeric material such as a polycarbonate material, an optionally bottom reflector membrane or material layer 35 and, a clear inner lightpipe membrane 30 disposed beneath the clear or translucent outer faceplate or, alternately, sandwiched between the reflector layer 35 and outer faceplate 25. The outer faceplate 25 and/or lightpipe membrane 30 may be totally clear, translucent, any suitable degree therebetween, or may have any other suitable optional properties. The plastic or polymeric material may be any suitable material including but not limited to polycarbonate, PBS, polystyrene, and acrylic. In one embodiment, the assembly 20 comprising outer faceplate 25, inner membrane 30 and optional bottom reflector layer 35 are similarly shaped, e.g., rectangular, having an inner opening or aperture 29 to accommodate coupling of the faceplate to edges 11 of the device 15 that extend beyond the plane of the wall. Other shapes of the faceplate assembly 20 and aperture 29 may be implemented. In addition, the lightpipe membrane 30 may be of any other suitable construction in addition to, or instead of, a membrane. In one embodiment, the faceplate itself may comprise a single lightpipe of unitary construction that may optionally include a clear or translucent coverplate and/or reflector or reflective surface.

The inner lightpipe membrane 30 and optional bottom reflector layer 35 are either fastened to or embedded at least partially within or within the outer clear faceplate 25. In one embodiment, at least the clear lightpipe membrane 30 is attached to the clear or translucent outer faceplate 25 such as by heat staking, press fitting, or ultrasonic welding, or any other suitable method. In one embodiment, the lightpipe membrane 30 includes a lens grade Polycarbonate or other suitable lightpipe material having a composition of facets and refractive structures 31 that functions to refract and maximally diffuse received light received at its inner edge 21 throughout its entire surface 26 (or a portion thereof) so as to completely (or partially) illuminate clear outer faceplate 25. Alternately, lightpipe membrane is a clear, or optical "plastic", or polymer, that would be of a specific array design or specific series of facets 31 whose purpose it is to distribute and/or reflect the incoming light from the electrical device body.

While the electrical device shown in FIG. 1 shows two power outlet receptacles in a single gang, the device 15 includes any electrical device, including but not limited to: an electrical light switch(es), a housing automation switch(es), a power outlet or socket, a GFCI dimmer, low voltage devices such as voice/data transceiver devices, sensors, or combinations of the above, in any one of a single or multi-gang configuration for home or business use. In one embodiment, such electrical powered devices may include those device such as the Acenti® line of products by Leviton Manufacturing Inc., such as Fan Speed Controller, lighting controls, receptacles, switches, "QuickPort" Inserts and Connectors, etc. The electrical power device 15 having a surface 16 is typically mounted within, for example, a junction box or like wall-box housing (not shown) configured to receive power lines, providing voltage for powering the device. In one embodiment, the electrical power device 15 is mounted such that its surface 16 and one or more faces or edges 11 protrudes beyond the plane of the wall to enable aligned coupling within the faceplate assembly 20 aperture 29. Particularly, in one embodiment, the inner edges 21 of lightpipe membrane 30 are of a thickness and include a complementary shaped surface such that when coupled, they align with edges 11 of the device 15. As will be explained in greater detail below, each edge(s) 11 of the electrical device provides light from a light source(s) integrated within the electrical device such that the respective inner edge surfaces 21 of membrane 30 receive the light emanating from the light sources at respective device edges 11.

In one embodiment, the wall-mounted electrical device 15 is configured to accommodate placement of one or more light sources, such light emitting diodes (LEDs) 40a, 40b shown in FIG. 1 (although any other suitable light sources may be used such as neon lights, incandescent bulbs, . . . ). It is noted that the electrical device 15, while including the one or more integrated lighting sources, uses a conventional wallbox and remains in compliance with standard National Electrical Manufacturers Association (NEMA) geometry. In one embodiment, the (LEDs) 40a, 40b are disposed within the electrical device 15 and coupled to circuitry for receiving power from the line voltage (power source of the electrical device 15). The light sources (LEDs) 40a, 40b connected to power circuitry within the electrical device are disposed such that a surface of each LED 40a, 40b is exposed at each edge 11 for communicating light at least partially outward from the electrical device 15 in a direction substantially parallel to the planar surface 16 of the electrical device and configured to point light to the respective edge of the faceplate (although any suitable angle may be employed). In one embodiment, a first light source (e.g., LED 40a) includes a firing surface disposed at a first side edge or face 12 of the electrical device and a second light source (e.g., LED 40a) includes a surface disposed at a second side edge or face 14 of the electrical device 15. While only two light sources (LEDs) 40a, 40b are shown integrated within the electrical device of FIG. 1, it is understood that each edge 11 of the device can provide a light source.

Figure 2:
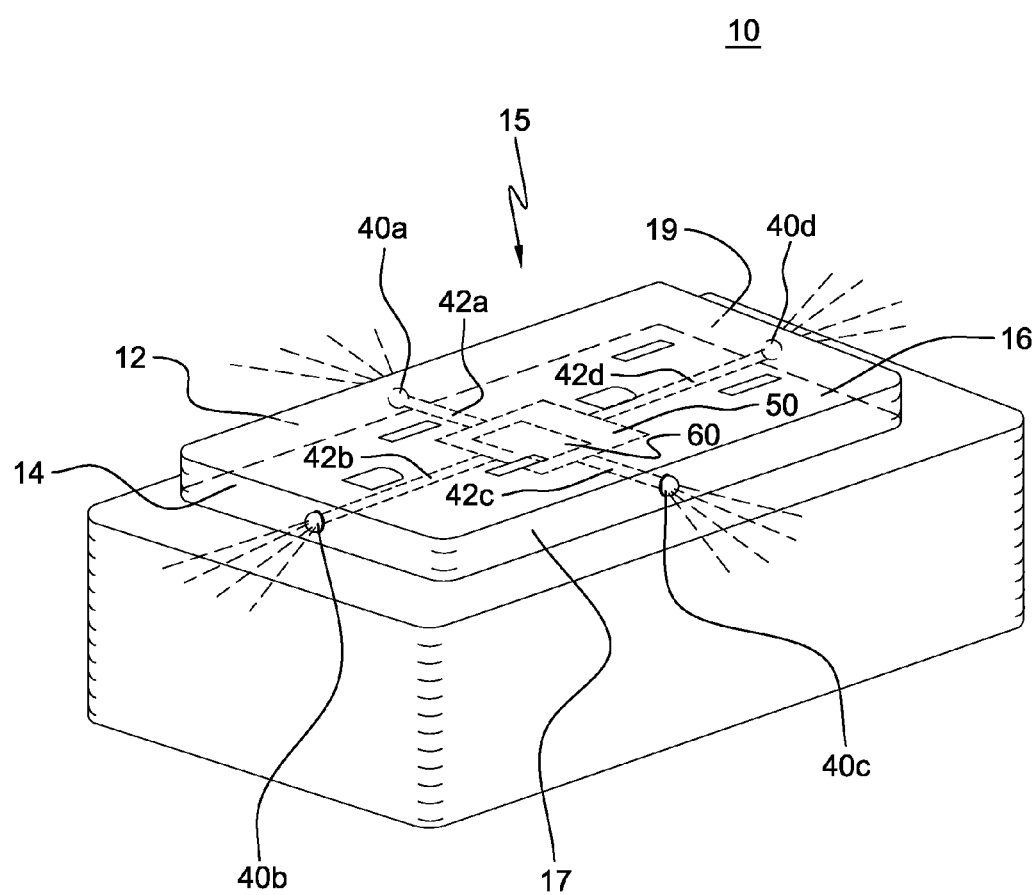
FIG. 2 illustrates a further example of the electrical device 15 of FIG. 1 showing additional integrated light sources.

FIG. 2 illustrates a further example of the electrical device 15 of FIG. 1 showing additional integrated light sources, i.e., an additional light source such as a rectangular shaped LED 40c having an outward firing surface disposed at an opposing first side edge or face 17 of the electrical device 15 and a further light source, side-fired rectangular shaped LED 40d, having an outward firing surface disposed at an opposing second side edge or face 19 of the electrical device 15. Generally, each exposed side edge of the powered electrical device that can accommodate placement of a light source or communicate light from an integrated light source can be aligned with the clear lightpipe membrane inner edge surface to ensure the entire clear outer faceplate surface is complete illuminated. In the generally rectangular shaped device 15 shown and described for exemplary purposes, each of the LED lighting sources 40a, 40b, 40c and 40d, in one embodiment, are configured in a manner such that the firing surfaces of the respective light sources are outwardly faced at or near a respective edge and, in one embodiment, the firing surfaces are co-planar with the surface of each respective side edge 12, 14, 17 and 19. Furthermore, each side "edge" of the electrical device 15 may include more than a single light source and may include multiple light sources on each side edge.

Furthermore, in an alternate embodiment, the light sources, e.g., LED, including other individual components for controlling power to the LEDs, can either be separately wired together to form a circuit within the device 15, or, the components may be situated on a printed circuit board (PCB) disposed within the electrical device 15 with the provision of respective lightpipe elements to communicate light from each light source to a respective side edge 11. In one embodiment, the LED lighting sources 40a, 40b, 40c and 40d are circular, square or of rectangular (or any other suitable shape) configuration drawing low current from the power lines on the order of milliamps for producing white or, a colored high intensity light, or any usable light for particular uses, as will be explained in greater detail herein below.

In one embodiment, as shown in FIGS. 1 and 2, the LEDs 40a-40d each have a surface portion thereof exposed in a manner such that when the "lightpipe" faceplate assembly 20 is coupled, such as by snap-fit or other fastening technique, over the device 15, the LEDs or other light source transfer light through the inner surface edge of the lightpipe membrane 30 which provides a light "guide" so that the membrane receives a maximum amount of light that can be reflected and diffused through the entire surface of the faceplate. That is, the clear lightpipe membrane 30 of assembly 20 is of a thickness enabling incorporation of light pipe features facets or guide structure that enable the light from the source to be distributed across the surface of the faceplate to produce a guidelight or nightlight effect, i.e., a continuous, consistently lighted surface with minimal variation of light intensity across the surface. As further shown in the exploded view of FIG. 1, the optional rear reflector layer 35 disposed beneath the clear lightpipe membrane 30 of faceplate assembly 20 is to reflect any received light back into the light pipe membrane for achieving a maximum light intensity.

Figure 3:
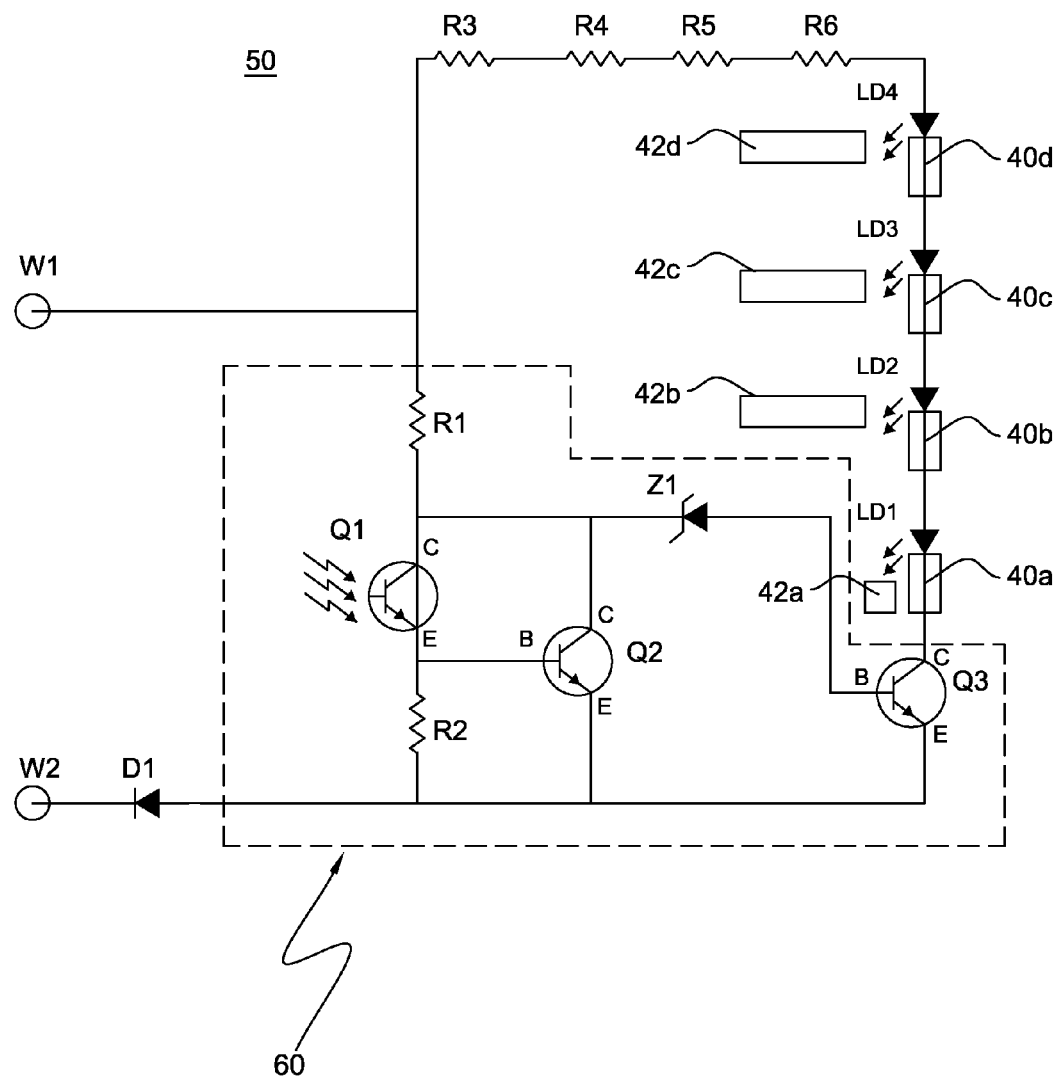
FIG. 3 depicts a diagram of one embodiment of a circuit 50 integrated within the electrical device 15 for powering and controlling operation of the light sources; and, FIG. 4 depicts a diagram of one embodiment of the faceplate 20' provided as an integral unit and showing its attached and illuminated state according to the principles of the invention; and, FIG. 5A illustrates a ratchet hook assembly for enabling a snap-fit attachment of the faceplate assembly to the electrical device; and, FIG. 5B illustrates an assembly of ridges 199 molded onto sides of the respective top and bottom of the faceplate device that catch the strap hooks for enabling a snap-fit attachment of the faceplate assembly to the wall-mounted electrical device.

In a further embodiment, the light sources (e.g., LEDs) integrated within electrical device 15 in the manner as shown in FIGS. 1 and 2, interact with a light sensor for achieving a safe nightlight effect without having to supply power to the faceplate assembly itself. FIG. 3 depicts a diagram of a circuit 50 integrated within the electrical device 15 for powering and controlling operation of the light sources (e.g., LEDs). As shown in the circuit 50 of FIG. 3, two terminals labeled as connection points W1 and W2 in FIG. 3 are provided for receiving the alternating current power line voltage or, a stepped-down DC voltage derived from the line voltage for powering the electrical device 15. Alternatively, if the electrical device 15 is a low voltage device such as a voice or data device, the LED's may be powered directly from the low voltage. In addition, the LED's may be powered by any suitable source as including but not limited to batteries, line voltage, low voltage, solar power, or a combination thereof. In one embodiment, the circuit 50 includes a series connection of resistors R3-R6 receiving current from the line that can power each of the light sources, e.g., LED 40a-40d to cause light generation under certain conditions.

Alternately, each of the light sources, e.g., LED's 40a-40d, are mounted at least partially within the device 15 on a printed circuit board or PCB surface beneath the top face or surface 16 of the electrical device, such that the light emanating from each respective surface is individually lightpiped (e.g., using lightpipes formed of lens-grade Polycarbonate material) to the side edge areas of the electrical device. For example, in FIGS. 2 and 3, respective lightpipe elements 42a-42d may be configured and located within the device 15 adjacent to a respective individual light source and extending to a respective side edge surface 12, 14, 17 and 19 for communicating light output from the respective light source surface to each respective side edge location 12, 14, 17 and 19.

As further shown in FIGS. 2 and 3, a control circuit 60 including devices R1-R2, D1, Z1 and transistors Q1-Q3 is configured to control the circuit 50. In one embodiment, control circuit functions to provide a On/Off control functions for the lighting sources. In circuit 60, a first transistor Q1 includes a photosensitive device, e.g., a phototransistor or like photosensitive detector or sensor, that is responsive to light energy (impacting photons) that can turn on/off the current flow through the circuit 50. For purposes of description, photosensitive device Q1 is a phototransistor that is integrated into the face of the main wiring device and having a surface exposed for detecting ambient light conditions. While the circuits 50 and 60 shown in FIG. 2 are beneath the top face 16 of the electrical device 15 for purposes of illustration, the locations of the circuits and/or the components comprising circuits 50, 60 may vary such as located on or, proximate near a side edge, or as space within electrical device 15 advantageously permits. For example, in the alternate embodiment including lightpiped light sources, the circuits 50, 60, and particularly the positioning of LED elements 40a-40d would be located such as to minimize lengths and/or routing distances of respective lightpipes 42a-42d.

Referring back to FIG. 3, in operation, phototransistor Q1 is biased by resistors R1 and R2 such that when ambient light is available in the environment the electrical device is located, then the phototransistor Q1 is turned on drawing current through resistor R2 for effectively turning on transistor Q2 which results in transistor Q3 turning off thereby preventing current flow to the LEDs via resistors R3-R6, thereby diminishing the LEDs light output or shutting the LEDs completely off. However, as the ambient light in the environment the electrical device is located is darkened, e.g., at night, the phototransistor Q1 becomes turned off effectively turning off transistor Q2 and causing transistor Q3 to turn on thereby completing a current path to the LEDs via resistors R3-R6, thereby enabling generation of LED light output. Preferably, the light source LEDs draw minimal current ranging up to several hundred milliamps.

Thus, in this manner, or with slight modification of circuits 50, 60 a light source(s) can be configured as an indicator for different states or operating modes of the wiring device (e.g., red for a locked out device, or tripped GFCI; green for an "on" state or condition, or GFCI protection; flashing lights for a condition indicating need for or requiring attention; and, multicolor transitioning for indicating proper operation). For example, the faceplate may be always be illuminated in white light so that it can function as a bright nightlight. Alternately or in addition, the faceplate may be under control of the ambient light conditions in the manner as described, and will only illuminate in low ambient light conditions. This occurs by means of the photosensor, integrated into the face of the main wiring device. It is understood that, the circuit 50, 60 and light source (LED) components can be with various colors, or constantly changing colors, e.g. when incorporating a timing circuit, for example in the circuit 50. Alternately, the colors may be programmable by the user. For example, in operation, only a red color LED connected to circuits 50, 60 can be caused to illuminate signal trouble modes for the electrical device. For instance, GFCI circuitry that would be used to control the light and normally placed in the device 15 itself, can activate the light when the device is tripped such that the outer faceplate is illuminated in a first color, e.g., red, when the device trips, and function as standard nightlight at all other times by illuminating the faceplate in a second color, e.g., green or white light. Alternately, or in addition, each light source can be configured as an indicator for different states or operating modes of the wiring device (e.g. red for a locked out device). Alternatively, the circuit can be configured to control light output at one or more levels of intensity, or, as "flashing", or combinations of both, based on predetermined conditions or programming.

Referring back to FIG. 1, as mentioned, the faceplate assembly 20 optionally includes a rear reflector membrane 35 comprising or including a colored paper or plastic material, e.g., white, and similarly shaped as the membrane 30 and outer faceplate 25. It is understood that the rear reflector membrane 35 may be of any suitable shape or material, and may include a reflective coating, that can be applied to a surface). As the outer faceplate is made of transparent type of material, for visual esthetics, the reflector membrane 35, is provided at least partially underneath the lightpipe membrane 30 of the faceplate 20 so that the wall or underlying surface of the faceplate is not visible (or only partially visible)—thereby rendering the faceplate visually more appealing. Placement of the reflector membrane 35 under the faceplate cover: 1) prevents the user from seeing the surface over which the faceplate is mounted; and 2) reflects to faceplate surface any additional light that inadvertently tries to bounce thru and out the bottom of the faceplate during an illumination stage. To this end, the reflector membrane 35 can be of any suitable color or contain multiple coatings or material layers with various coordinating/contrasting colors, ivory, white or almond. In an example implementation, the reflector membrane 35 is the same color as the powered device 15 so as to mask the underlying wall surface.

Figure 4:
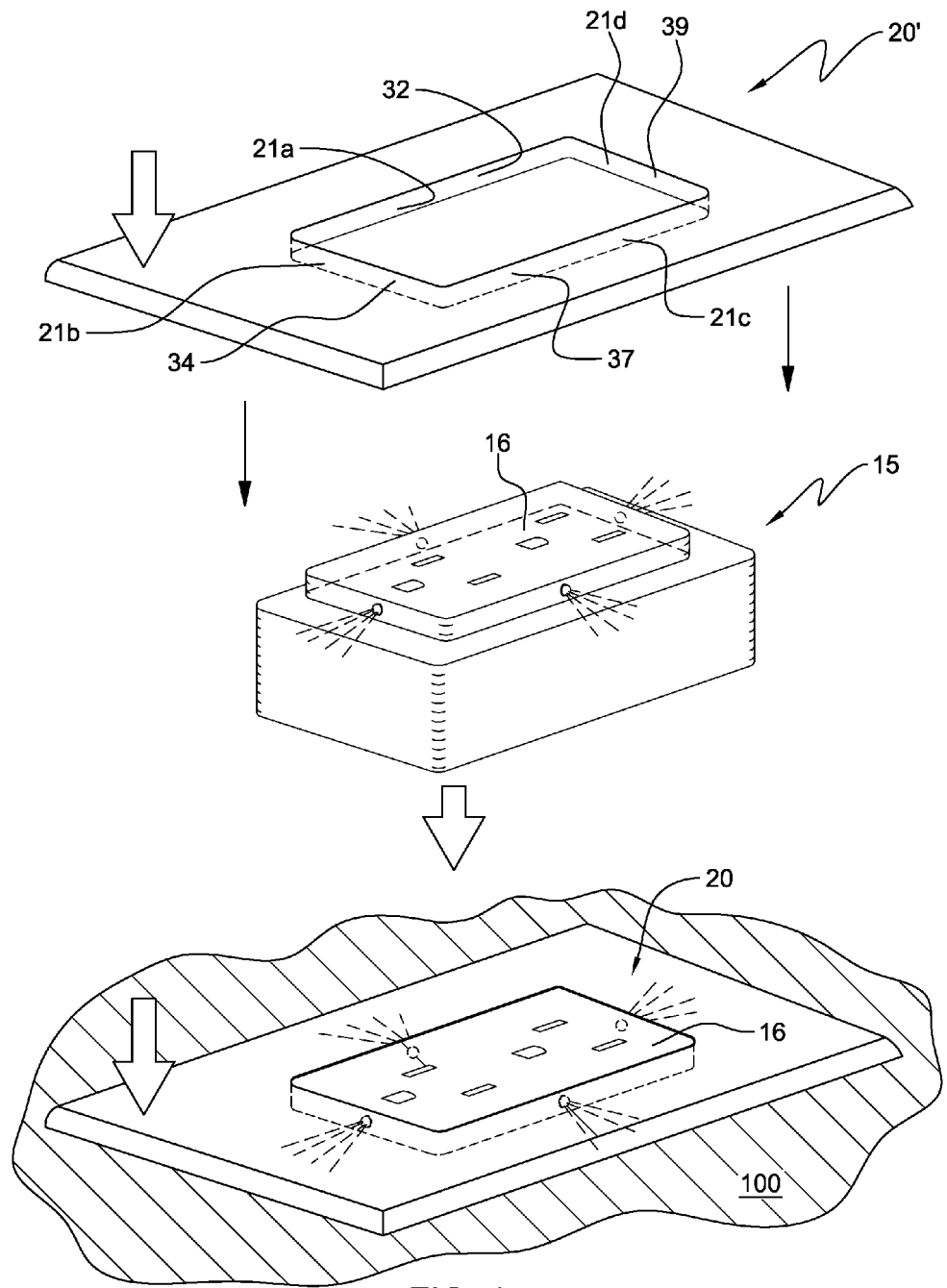

As shown in FIG. 4, in one alternate embodiment, the entire faceplate 20' is a single clear plastic or polymeric unit, with a facet design 31 molded into the bottom of the faceplate and may be painted a color, e.g., white, to provide the reflective background. The top surface of this one piece faceplate design 20' is clear plastic and polished. In both embodiments, the faceplate assembly 20 including opening or aperture 29 is dimensioned to ensure a snap-fit over the device 15, with the outer faceplate situated flush against the wall surface 100 when fastened thereto. In the example embodiment depicted in FIG. 4, the opening 29 is a rectangular opening adapted to fit over the largely rectangular electrical device 15 such that the entire faceplate assembly may be snap-fit in the manner such as shown and described in U.S. Pat. No. 5,723,817, incorporated by reference as if fully set forth herein.

The faceplate cover, whether formed of an assembly 20 including a combination of membrane 30 and cover 25, or whether a single integrated unit 20' such as shown in FIG. 4, is of a thickness so that the exposed inner surfaces 32, 34, 37 and 39 of the formed aperture 29 contact or abut respective side edge faces 12, 14, 17 and 19 of the electrical device 15. The exposed inside lens grade quality surfaces 32, 34, 37 and 39 of the aperture 29 include respective portions 21a, 21b, 21c and 21d that contact or abut the respective surfaces of the LEDs 40a, 40b, 40c and 40d to maximize the amount (or to regulate a portion thereof) of light coupled from the respective light sources. Thus, when the integrated faceplate assembly 20 is overlayed on to the wall-mounted electrical device itself, the clear lightpipe membrane 35 of assembly 20 is indexed to directly receive the high intensity beams of light outwardly directed from the side edges of the electrical device 15, in a direction substantially parallel to the planar surface of the electrical device, from the light sources, e.g., LEDs 40a-40d (FIG. 1) or respective exposed lightpipe surfaces 42a-42d (FIG. 2). The clear lightpipe membrane 30 or single integrated clear plastic unit 20' incorporates light pipe features including incorporation and manufacture of facets and refractive surfaces 31 that enable the light from the sources to be substantially or partially distributed across the entire surface of the clear faceplate to produce, in one embodiment, a guidelight or nightlight effect, such as shown in FIG. 4, to provide low level illumination in a room or passageway, e.g., during the night.

Figure 5A:
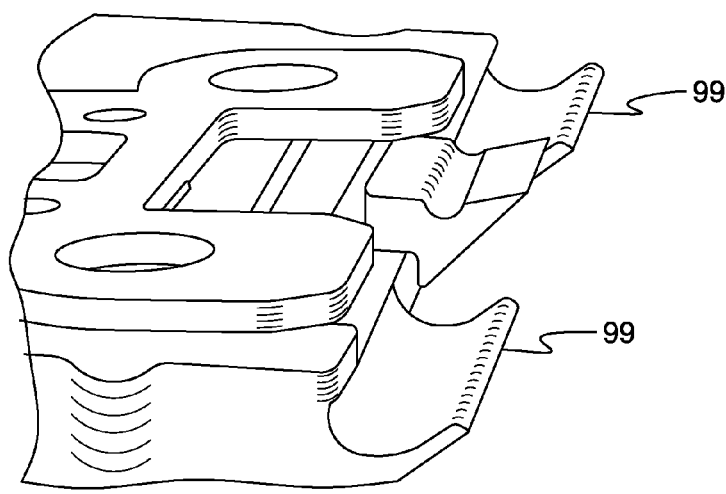
Figure 5B:
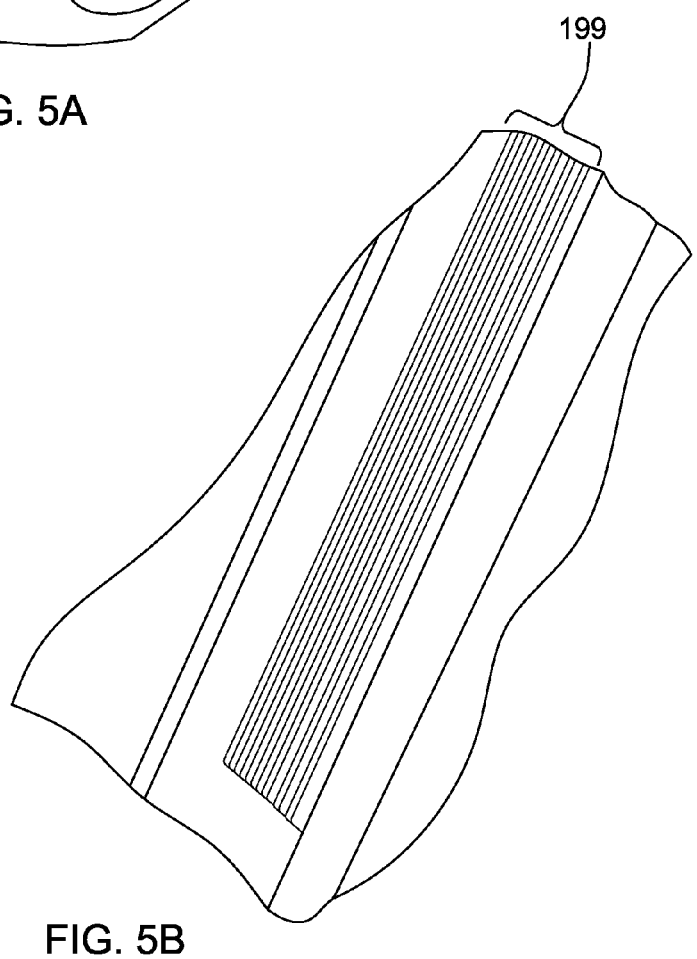

As mentioned, the illuminating faceplate, whether formed of an assembly 20 including a combination of the lightpipe membrane 30 and optional reflector 35 and outer faceplate or cover 25, or whether a single integrated unit 20' such as shown in FIG. 4, may be formed to overlay the wiring device and ganged box and/or snap-fit on to or otherwise engage the electrical device 15. In one embodiment, for example, the faceplate assembly 20 or single integrated unit 20' will snap over the device by means of snap details, depicted in FIG. 5A as the ratchet hooks 99 on the strap 98, located at the top and bottom of the wall-mounted electrical device, e.g., an electrical outlet socket. These details, e.g., ratchet hooks 99 in one embodiment, will engage mating edge details, e.g., ridges 199 that catch the strap hooks, molded onto the device face sides of the respective top and bottom of the device's face geometry.

Further, the integrated faceplate unit (assembly) can be illuminated even though there is no wiring or electrical power thru any portion of the snap-on faceplate. Advantageously, this provides a safe means of providing light to a large portion of the faceplate without any special wiring (the lighting sources are integrated into the device itself (switch, receptacle, etc). This means that if the faceplate becomes cracked or damaged, there are no live parts in the faceplate to pose as a hazard. Further, the installation of this lighting system is transparent because it is automatically hooked up as soon as the device (switch, receptacle, etc) is installed. There is no special or extra wiring.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. An illumination system for an electrical box mountable electrical device having a housing including a front face and at least one side edge portion extending from said front face, said system comprising:

at least one light source disposed at least partially within an electrical device and adapted for generating output light at said at least one side edge portion of said electrical device; and, a faceplate adapted to overlay said electrical device, said faceplate comprising:

an outer plate which is at least partially translucent or is transparent; and, a lightpipe membrane fastened to or integrated within the outer plate, said lightpipe membrane having at least one lightpipe membrane inner edge surface portion; wherein, when said faceplate overlies said electrical device, said at least one said lightpipe membrane inner edge surface portion is aligned with at least one side edge portion of said device, wherein generated output light at a side edge portion of said electrical device is received by said lightpipe membrane via a respective said at least one inner edge surface portion, said lightpipe membrane diffusing said received light for illuminating an exposed surface of said translucent or transparent outer plate, where electrical power is not transmitted to or through the faceplate.

2. The illumination system as claimed in claim 1, wherein said faceplate cover assembly further comprises a reflector element disposed adjacent to and underlying said lightpipe membrane and fastened to or integrated with said faceplate cover assembly for reflecting any light received by said lightpipe membrane to said exposed surface of said translucent or transparent outer plate.

3. The illumination system as claimed in claim 1, wherein said electrical device is configured to received power from a line voltage source, said system further comprising:

a control circuit disposed to provide electrical power from said line voltage source to said at least one light source for controlling said at least one light source according to one or more pre-determined conditions.

4. The illumination system as claimed in claim 3, wherein said electrical device comprises a light sensor adapted to detect an ambient light level, and where one of said pre-determined conditions including one of:
an absence of detected light;
the presence of detected light; and
a predetermined amount of detected light.

5. The illumination system as claimed in claim 3, where the control circuit is disposed to control at least one output parameter of the light source where the output parameter is one of: color; intensity; pulse rate; or a combination thereof.

6. The illumination system as claimed in claim 3, wherein a pre-determined condition of said device includes a detected operating mode of said electrical device, said detected operating mode causing said control circuit to enable power flow to one or more of said at least one light sources for illuminating said translucent or transparent outer faceplate cover.

7. The illumination system as claimed in claim 6, wherein one of said at least one light sources generates light for illuminating said translucent or transparent outer faceplate cover of a pre-determined color indicating a detected operating mode.

8. The illumination system as claimed in claim 1, wherein each of said at least one light sources comprises a light emitting diode.

9. The illumination system as claimed in claim 1, wherein one of said at least one light source is located at or near a respective said at least one side edge portion of said electrical device such that a surface of said light source is disposed at a respective said side edge portion of said device.

10. The illumination system as claimed in claim 1, wherein each said integrated light sources is disposed on a printed circuit board housed at least partially within said electrical device, said system further comprising:
a respective light pipe element formed adjacent a respective surface of said light source and extending to a respective said at least one side edge portion of said device for communicating light output from the respective light source surface to each respective side edge surface of said electrical device.

11. The illumination system as claimed in claim 1, wherein said electrical device is a single or multi-gang configuration, said electrical device selectively comprising:
a power outlet; a switch; a dimmer switch device, an electrical socket, an building automation unit, a low voltage device; a voice or data device; a transceiver device; sensors; or any combination thereof.

12. The illumination system as claimed in claim 1, wherein said translucent or transparent outer plate is formed of a clear plastic material.

13. The illumination system as claimed in claim 1, wherein said underlying lightpipe membrane is dimensioned to substantially fit within an area and volume defined by said translucent or transparent outer plate.

14. The illumination system as claimed in claim 2, wherein both said underlying lightpipe membrane and reflector element is dimensioned to substantially fit within an area and volume defined by said translucent or transparent outer cover plate.

15. The illumination system as claimed in claim 2, wherein said reflector element comprises a paper, plastic or a surface reflective coating material adapted for reflecting light.

16. The illumination system as claimed in claim 2, wherein said material of said reflector element is colored to match the color of said electrical device.

17. The illumination system as claimed in claim 2, where the reflector has at least a portion which is at least partially opaque such that the reflector is disposed to mask an underlying portion of a surface upon which said electrical device is mounted.

18. The illumination system as claimed in claim 16, wherein said material includes a single layer or multiple layers of paper, plastic or reflective coating material of a single color or of various coordinating/contrasting colors.

19. The illumination system as claimed in claim 1, wherein said faceplate comprises a single translucent or transparent lightpipe of unitary construction.

20. A method for illuminating an electrical box mountable electrical device having a housing including a front face and at least one side edge portion extending from said front face, said method comprising:
attaching a faceplate to said electrical device, said faceplate adapted to overlay said electrical device and said faceplate including an outer plate which is at least partially translucent or transparent and, a lightpipe membrane fastened to or integrated within the outer plate, said lightpipe membrane having at least one lightpipe membrane inner edge surface portion configured to align with said at least one side edge portion of said device;
detecting a condition of said electrical device;
conducting, through a control circuit, electrical power to a light source integrated in said electrical device and adapted for generating light for output at said at least one side edge portion of said device in response to said detected condition, said conducted power for generating light from said at least one light source integrated within said device;
receiving, at said underlying lightpipe membrane, said light generated from an integrated powered light source; and
diffusing, by said underlying lightpipe membrane, said received light for illuminating an exposed surface of said translucent or transparent outer plate.

21. The method for illuminating as claimed in claim 20, wherein said faceplate further comprises a reflector element underlying said lightpipe membrane and fastened to or integrated therewith, said method further comprising: reflecting, by said reflector element, any light received by said lightpipe membrane to said exposed surface of said translucent or transparent outer cover plate.

22. The method for illuminating as claimed in claim 20, further comprising:
using a light sensor to detect the amount of ambient light or the absence thereof; and, one of:
energizing said at least one light sources to illuminate said translucent or transparent outer faceplate cover based on a predetermined to the level of, or the absence of, the ambient light level.

23. The method for illuminating as claimed in claim 22, further comprising:
energizing the light source when the level of ambient light is below a predetermined level.

24. The method for illuminating as claimed in claim 22, where the control circuit is disposed to control at least one output parameter of the light source where the output parameter is one of: color; intensity; pulse rate; or a combination thereof.

25. The method for illuminating as claimed in claim 20, wherein a detected operating condition of said device includes an operating mode of said electrical device, said method further comprising:

responsive to a detected operating mode, using said control circuit to energize said at least one light sources for illuminating said translucent or transparent outer faceplate cover.

26. The method for illuminating as claimed in claim 20, further comprising:

responsive to a detected operating condition, adapting said control circuit to enable power flow to one or more predetermined light sources of said at least one light sources for illuminating said translucent or transparent outer faceplate with a predetermined color associated with the detected operating condition.

27. A faceplate lightpipe for an electrical box mountable electrical device, the electrical device having a housing including a front face and a side edge surface extending from said front face, said electrical device configured to emit light from said side edge surface, said faceplate lightpipe comprising:

a first translucent or transparent front surface; and an inner edge surface portion extending from said front surface;

wherein when said faceplate lightpipe is overlaid onto the electrical device said front surface is exposed and said inner edge surface portion is arranged and configured to receive the emitted light from the side edge surface of the electrical device, and wherein said faceplate lightpipe is adapted and configured to diffuse said received light such that said exposed front surface is illuminated without transmitting electrical power to or through the faceplate lightpipe.

28. The faceplate lightpipe as claimed in claim 27, further comprising a second light reflecting surface.

29. The faceplate lightpipe as claimed in claim 27, further comprising at least one lightpipe inner edge surface portion, such that said at least one said lightpipe inner edge surface portion aligns with a respective said at least side edge portion of said electrical device for receiving light from a light source integrated within said mountable electrical device.

* * * * *